UNITED STATES PATENT OFFICE.

LAUNCELOT W. ANDREWS, OF CHICAGO, ILLINOIS.

PROCESS OF MANUFACTURING NITRO COMPOUNDS.

1,283,617.   Specification of Letters Patent.   Patented Nov. 5, 1918.

No Drawing. Application filed February 8, 1917, Serial No. 147,366. Renewed September 14, 1918. Serial No. 254,125.

*To all whom it may concern:*

Be it known that I, LAUNCELOT W. ANDREWS, a citizen of the United States, residing at Chicago, in the county of Cook and State of Illinois, have invented certain new and useful Improvements in Processes of Manufacturing Nitro Compounds, of which the following is a specification.

This invention relates to an improved process of manufacturing nitro-compounds.

One object of the invention is to avoid, prevent, or diminish oxidation of constituents subject thereto, more particularly in certain cases, namely, those in which the substance to be nitrated is of such a nature as to be apt to be changed or injured by oxidation, the invention being of especial importance in the dye and synthetic medicine industry, where it is often extremely important not to injure the easily oxidizable substance which is to be nitrated, for example in the manufacture of nitroanilin.

Another object of the invention is to provide an improved process to make the manufacture of nitro-explosives safer, by avoiding rise of temperature during the making of such compounds with consequent risk of fire and of explosion.

In the manufacture of nitro-glycerin and of organic nitro bodies, such as trinitrotoluene or picric acid, there is a well known tendency for the nitric acid used in the manufacture to act, not only as a nitrating agent, but, also as an oxidant. This causes a production of nitrogen peroxid (brown fume) which is in many ways highly deleterious. Firstly, it behaves as a catalyzer of the oxidizing reaction or, in other words, it promotes the oxidization and so produces a still more rapid formation of peroxid and causes a dangerous rise of temperature. Secondly, it leads to the formation of nitroso compounds and of other substances which impair the stability and keeping quality of the desired product and which are difficult to remove completely from the latter.

The improved process of the present invention consists in adding an acid amid initially to the nitrating mixture, that is before any explosive body is formed. The acid amid which I prefer to employ is urea (also called carbamid), $CO(NH_2)_2$. This substance, as is well known reacts instantaneously with nitrous acid, producing carbon dioxid and nitrogen as shown by the equation:

$$2HNO_2 + CO(NH_2)_2 = 2N_2 + CO_2 + 3H_2O.$$

Nitrogen peroxid acts in a similar manner, to wit:

$$6NO_2 + 4CO(NH_2)_2 = 7N_2 + 4CO_2 + 8H_2O.$$

The urea in the reaction mass obstructs the nitric acid from acting as an oxidizing agent. In other words it hinders the reduction of the nitric acid $HNO_3$ to nitrous acid, $HNO_2$. The first traces of nitrogen peroxid and nitrous acid are thus removed or destroyed as soon as formed, the injurious sequence of events hereinbefore outlined, is stopped at its beginning so that an increase in the rate of oxidation is made impossible, dangerous heating is avoided and the formation of nitroso compounds is prevented.

The nitrating mixture usually consists of a mixture of nitric acid and sulfuric acids. Less often it is nitric acid alone. It sometimes is a mixture of sodium nitrate and sulfuric acid. In rarer cases it is a mixture of nitric acid and phosphoric acid anhydrid $P_2O_5$. In instances as in the dye and synthetic medicine industry where it is often extremely important not to injure the easily oxidizable substance which is to be nitrated, the composition of the nitrating mixture is subject to great variation according to the requirements of the particular case. I therefore desire it to be understood that the term "nitrating mixture" as employed in the specification comprehends such mixtures as are, or may be, used for the nitration of organic compounds, as, for example nitric acid, or nitric and sulfuric acid, or nitric acid and glacial acetic acid, or nitric acid and phosphoric anhydrid, or sodium nitrate and sulfuric acid, or other nitrates in conjunction with sulfuric acid, or any analogous mixture having in common with those named the function and ability of converting suitable organic compounds into nitro compounds.

In applying the invention to the manufacture of nitroglycerin, the urea, which may be one per cent. of the charge, is dissolved in the acid and in the glycerin, previous to mixing the same together, one-half of the urea to the acid and the other half to the glycerin. The carbamid remaining after the nitration in the spent acid interferes in no way with the recovery of the acid therefrom.

The urea serves to check or reduce the oxidizing power of the nitric acid without checking or reducing its nitrating power, the decomposition of the nitric acid being thus prevented during the manufacture of the nitro body. It is completely removed from the product during the usual subsequent washing process, its use indirectly making the resulting explosive more stable by increasing its purity, the final resulting product being free from both nitrous acid and urea.

In applying the improved process to those cases in which carbamid cannot be dissolved in the material to be nitrated, as, for example, cellulose, it may be dissolved only in the nitrating acid mixture, being used preferably in the form of urea nitrate.

While, in most instances, urea is preferred to other amids for the purposes hereinbefore pointed out, oxamid may be employed in like manner, and, in fact, acid amids generally which act in substantially the same way, are equivalent to and essentially identical with carbamid for the uses and purposes of this invention. The use of other amids is contemplated when questions of relative cost or when peculiarities of individual nitration problems render their use advisable.

What I claim is:

1. The process of making an organic nitro-compound comprising nitrating the organic compound with a nitrating mixture containing an acid amid.

2. The method of making an organic nitro-compound comprising nitrating the organic compound with a nitrating mixture, and checking undue oxidation during the nitrating process by an acid amid.

3. The method of making an organic nitro-compound comprising nitrating the organic compound with a nitrating mixture, and checking undue oxidation during the nitrating process by the addition of urea.

4. The process of making nitro derivatives, by treating organic bodies or materials with a mixture containing urea and nitric acid.

5. The process of making nitro derivatives by treating organic bodies or materials with a nitrating mixture containing urea.

6. The process of replacing hydrogen atoms by nitro groups, in a substance containing hydrogen and carbon, by treating said substances with nitric acid in the presence of urea.

7. The process of replacing hydrogen atoms by nitro groups in a substance containing hydrogen and carbon, by treating said substances with a nitrating mixture containing urea.

8. The method of checking or reducing the oxidizing power of nitric acid without checking or reducing its nitrating power consisting in the addition of urea thereto.

9. The process of making nitro cellulose by treating a cellulose material with nitric acid and urea.

10. The process of making nitro cellulose by treating a cellulose material with a nitrating mixture containing urea.

11. The method of checking or reducing the oxidizing power of nitric acid without checking or reducing its nitrating power consisting in the addition of an acid amid thereto.

12. The process of making an organic nitro-compound comprising nitrating the organic compound with a nitrating mixture containing an acid amid readily reactive with nitrous acid.

In testimony whereof I affix my signature in the presence of two witnesses.

LAUNCELOT W. ANDREWS.

Witnesses:
  W. D. HOLLISTER,
  E. K. STIN.